United States Patent
Berger et al.

(10) Patent No.: US 11,411,462 B1
(45) Date of Patent: *Aug. 9, 2022

(54) SUPPORT ASSEMBLY FOR ROTATING BODY

(71) Applicant: Zoox, Inc., Foster City, CA (US)

(72) Inventors: Adam Berger, Mountain View, CA (US); Brian Pilnick, East Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/918,480

(22) Filed: Jul. 1, 2020

Related U.S. Application Data

(63) Continuation of application No. 15/487,110, filed on Apr. 13, 2017, now Pat. No. 10,742,088.
(Continued)

(51) Int. Cl.
*H02K 5/22* (2006.01)
*H02K 5/16* (2006.01)
(Continued)

(52) U.S. Cl.
CPC ............... *H02K 5/225* (2013.01); *H02K 5/10* (2013.01); *H02K 5/161* (2013.01); *G01S 17/10* (2013.01)

(58) Field of Classification Search
CPC .. H02K 5/00; H02K 5/10; H02K 5/22; H02K 5/225; H02K 5/16; H02K 5/161;
(Continued)

(56) References Cited

U.S. PATENT DOCUMENTS 2,203,672 A * 6/1940 Chester ............... A47J 43/044
241/199.12
2,350,534 A 6/1944 Rosinger
(Continued)

FOREIGN PATENT DOCUMENTS

DE 3436896 A1 6/1985
EP 2410358 A1 1/2012
(Continued)

OTHER PUBLICATIONS

European Office Action dated Jul. 21, 2020 for European Patent Application No. 17835971.7 counterpart foreign application of the U.S. Pat. No. 10,122,416, 5 pages.
(Continued)

*Primary Examiner* — Tran N Nguyen
(74) *Attorney, Agent, or Firm* — Lee & Hayes, P.C.

(57) ABSTRACT

A support assembly for supporting a rotating body may include first and second supports defining first and second longitudinal support axes and configured to support the rotating body, such that the rotating body is rotatable relative to the first and second supports. A rotation axis about which the rotating body rotates may be transverse to the first and second longitudinal support axes. The support assembly may also include a spine coupled to the first and second supports. The support assembly may also include a motor associated with at least one of the first or second supports and configured to supply torque to rotate the rotating body. At least one of the spine, the first support, or the second support may define a recess configured to receive at least one of an electrical conductor or a data signals link associated with operation of the rotating body.

20 Claims, 8 Drawing Sheets

Related U.S. Application Data

(60) Provisional application No. 62/440,683, filed on Dec. 30, 2016.

(51) Int. Cl.
*H02K 5/10* (2006.01)
*G01S 17/10* (2020.01)

(58) Field of Classification Search
CPC .......... G01S 17/10; Y10T 83/00; Y10T 83/22; Y10T 83/221; Y10T 83/2216; Y10S 83/00; Y10S 83/93; Y10S 83/932; A47J 43/00; A47J 43/04; A47J 43/044; A47J 43/07; A47J 43/071; A47J 43/0711; A47J 43/072; A47J 43/0722; B26D 1/00; B26D 1/43; B26D 3/00; B26D 3/11; B26D 3/22; B26D 5/00; B26D 5/08; B26D 5/086; B26D 7/00; B26D 7/06; B26D 7/064; B26D 7/0641; G02B 7/00; G02B 7/18; G02B 7/182; G02B 7/1821; G02B 21/00; G02B 21/002; G02B 26/10
See application file for complete search history.

(56) References Cited

U.S. PATENT DOCUMENTS

| | | | |
|---|---|---|---|
| 3,790,277 A | 2/1974 | Hogan | |
| 3,964,646 A | 6/1976 | Yazawa et al. | |
| 4,101,794 A | 7/1978 | Miller et al. | |
| 4,154,529 A | 5/1979 | Dyott | |
| 4,410,280 A | 10/1983 | Yamauchi et al. | |
| 4,516,158 A | 5/1985 | Grainge et al. | |
| 4,700,301 A | 10/1987 | Dyke | |
| 4,709,195 A | 11/1987 | Hellekson et al. | |
| 5,098,185 A | 3/1992 | Watanabe et al. | |
| 5,202,742 A | 4/1993 | Frank et al. | |
| 5,303,084 A | 4/1994 | Pflibsen et al. | |
| 5,337,189 A | 8/1994 | Krawczyk et al. | |
| 5,428,438 A | 6/1995 | Komine | |
| 5,703,351 A | 12/1997 | Meyers | |
| 5,710,474 A | 1/1998 | Mulgrave | |
| 6,046,800 A | 4/2000 | Ohtomo et al. | |
| 6,115,128 A | 9/2000 | Vann | |
| 6,690,128 B1 | 2/2004 | Cotton et al. | |
| 6,778,732 B1 | 8/2004 | Fermann | |
| 7,089,114 B1 | 8/2006 | Huang | |
| 7,248,342 B1 | 7/2007 | Degnan | |
| 7,255,275 B2 | 8/2007 | Gurevich et al. | |
| 7,259,838 B2 | 8/2007 | Carlhoff et al. | |
| 7,311,000 B2 | 12/2007 | Smith et al. | |
| 7,361,948 B2 | 4/2008 | Hirano et al. | |
| 7,417,716 B2 | 8/2008 | Nagasaka et al. | |
| 7,544,945 B2 | 6/2009 | Tan et al. | |
| 7,969,558 B2 | 6/2011 | Hall | |
| 8,050,863 B2 | 11/2011 | Trepagnier et al. | |
| 8,477,290 B2 | 7/2013 | Yamada | |
| 8,675,181 B2 | 3/2014 | Hall | |
| 8,742,325 B1 | 6/2014 | Droz et al. | |
| 8,767,190 B2 | 7/2014 | Hall | |
| 8,836,922 B1 | 9/2014 | Pennecot et al. | |
| 9,069,060 B1 | 6/2015 | Zbrozek et al. | |
| 9,086,273 B1 | 7/2015 | Gruver et al. | |
| 9,285,464 B2 | 3/2016 | Pennecot et al. | |
| 9,299,731 B1 | 3/2016 | Lenius et al. | |
| 9,368,936 B1 | 6/2016 | Lenius et al. | |
| 9,529,079 B1 | 12/2016 | Droz et al. | |
| RE46,672 E | 1/2018 | Hall | |
| 10,742,088 B2 * | 8/2020 | Berger | H02K 5/225 |
| 2002/0140924 A1 | 10/2002 | Wangler et al. | |
| 2005/0124310 A1 | 6/2005 | Yamamoto et al. | |
| 2008/0316463 A1 | 12/2008 | Okada et al. | |
| 2010/0110006 A1 | 5/2010 | Lee et al. | |
| 2010/0220141 A1 | 9/2010 | Ozawa | |
| 2010/0302528 A1 | 12/2010 | Hall | |
| 2011/0216304 A1 | 9/2011 | Hall | |
| 2011/0255070 A1 | 10/2011 | Phillips et al. | |
| 2012/0188136 A1 | 7/2012 | Brasile et al. | |
| 2012/0194398 A1 | 8/2012 | Brasile et al. | |
| 2012/0274147 A1 | 11/2012 | Stecher et al. | |
| 2014/0274216 A1 | 9/2014 | Olodort | |
| 2014/0295755 A1 | 10/2014 | Graf | |
| 2015/0055117 A1 | 2/2015 | Pennecot et al. | |
| 2015/0091374 A1 | 4/2015 | Lenius et al. | |
| 2015/0193934 A1 | 7/2015 | Fuchikami et al. | |
| 2015/0293228 A1 | 10/2015 | Retterath et al. | |
| 2016/0047901 A1 | 2/2016 | Pacala et al. | |
| 2016/0274221 A1 | 9/2016 | Wu et al. | |
| 2016/0380487 A1 | 12/2016 | Widmer et al. | |
| 2017/0176576 A1 | 6/2017 | Kotelnikov et al. | |
| 2017/0350967 A1 | 12/2017 | Wilton et al. | |
| 2018/0191222 A1 | 7/2018 | Berger et al. | |
| 2018/0191404 A1 | 7/2018 | Berger et al. | |

FOREIGN PATENT DOCUMENTS

| | | |
|---|---|---|
| EP | 2858204 | 4/2015 |
| JP | 2000092752 A | 3/2000 |
| JP | 2010036287 | 10/2013 |
| JP | WO2015108153 A1 | 3/2017 |
| WO | WO03073123 | 9/2003 |
| WO | WO2012172526 A1 | 12/2012 |

OTHER PUBLICATIONS

European Office Action dated Mar. 31, 2021 for European Patent Application No. 17835971.7, a foreign counterpart of U.S. Pat. No. 10,122,416, 4 pages.

Japanese Office Action dated Sep. 21, 2021 for Japanese Patent Application No. 2019-556789, a foreign counterpart to U.S. Pat. No. 10,122,416, 26 pages.

U.S. Appl. No. 14/462,075, filed Aug. 18, 2014, Pennecot et al., "Devices and Methods fora Rotating LIDAR Platform with a Shared Transmit/Receive Path," 55 pages.

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>> 2 pages.

Notice of Allowance from the U.S. Patent and Trademark Office for U.S. Appl. No. 14/462,075, dated Nov. 18, 2015. 8 pages.

Final Office Action dated Jul. 30, 2019 for U.S. Appl. No. 15/487,110 "Support Assembly for Rotating Body" Berger, 11 pages.

Office Action for U.S. Appl. No. 15/487,110, dated Nov. 14, 2019, Berger, "Support Assembly for Rotating Body", 9 pages.

Office Action for U.S. Appl. No. 15/487,044, dated Mar. 14, 2018, Berger, "Interface for Transferring Power and Data Between a Non-Rotating Bodyand a Rotating Body", 13 pages.

Office Action for U.S. Appl. No. 15/706,413, dated Mar. 16, 2018, Franz, "Interface for Transferring Data Between a Non-Rotating Bodyand a Rotating Body", 11 pages.

Office action for U.S. Appl. No. 15/487,110, dated Mar. 22, 2019, Berger, "Support Assembly for Rotating Body", 8 pages.

Office Action from the U.S. Patent and Trademark Office ofr U.S. Appl. No. 14/462,075, dated Jun. 17, 2015. 14 pages.

PCT Invitation to Pay Additional Fees dated Mar. 12, 2018 for PCT application No. PCT/US2017/067553, 16 pages.

PCT Search Report and Written Opinion dated May 7, 2018, for PCT Application No. PCT/US17/67553, 19 pages.

PCT Search Report and Written Opinion dated Nov. 19, 2014 for PCT Application No. PCT/US2014/047864, 12 pages.

Rim et al., "The optical advantages of curved focal plane arrays," Optics Express, vol. 16, No. 7, Mar. 31, 2008, 1 page.

Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.

European Office Action dated Apr. 26, 2022 for European Patent Application No. 17835971.7, a foreign counterpart to U.S. Pat. No. 10,122,416, 3 pages.

(56) References Cited

OTHER PUBLICATIONS

Japanese Office Action dated Apr. 19, 2022 for Japanese Patent Application No. 2019-556789, a foreign counterpart to U.S. Pat. No. 10,122,416, 18 pages.

* cited by examiner

US 11,411,462 B1

SUPPORT ASSEMBLY FOR ROTATING BODY

RELATED APPLICATIONS

This application is a continuation of and claims priority to U.S. Non-Provisional application Ser. No. 15/487,110, filed Apr. 13, 2017, which is a non-provisional of U.S. Provisional Application No. 62/440,683, filed Dec. 30, 2016, both of which are incorporated herein by reference for all purposes.

BACKGROUND

There may be circumstances in which it would be beneficial to support a rotating body and transfer electrical power and data between a non-rotating body and the rotating body. For example, it may be beneficial to provide a rotating body to carry one or more sensors configured to generate sensor signals, so the one or more sensors may be aimed to provide sensor signals throughout a range of angles of rotation. In addition, if electronic devices and sensors carried by the rotating body require electrical power for operation, and the sensors generate data signals, it may be beneficial to transfer electrical power to the rotating body and data signals from the sensors associated with the rotating body to a non-rotating body. However, rotation of the rotating body may prevent the use of hard-wired connections between the rotating body and the non-rotating body.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
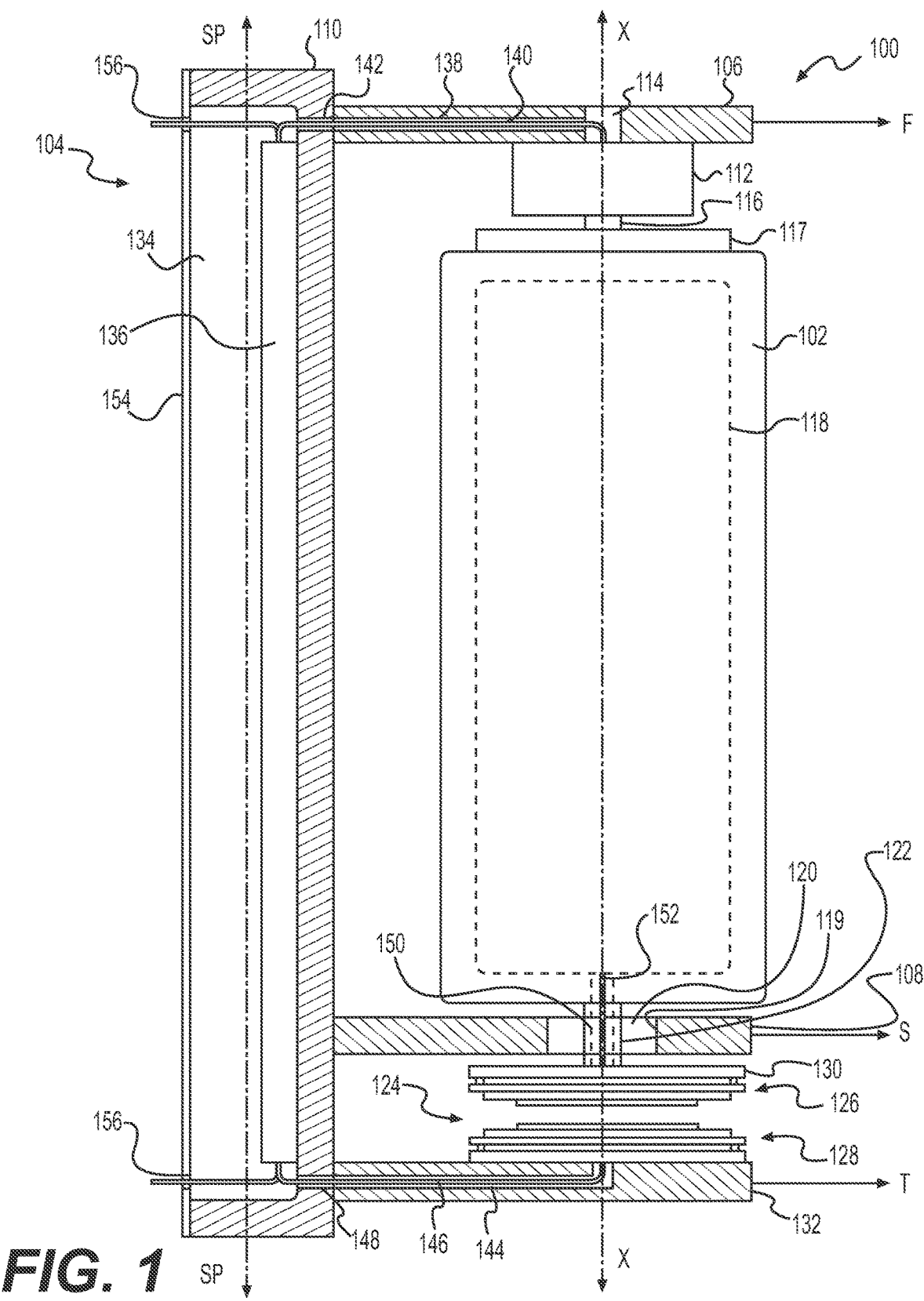
FIG. 1 is a partial schematic side section view of an example system including an example rotating body and an example support assembly for supporting the rotating body.

As discussed above, there may be circumstances in which it would be beneficial to support a rotating body and transfer electrical power and data between a non-rotating body and the rotating body. For example, it may be beneficial to provide a rotating body to carry one or more sensors configured to generate sensor signals, so the one or more sensors may be aimed to provide sensor signals throughout a range of angles of rotation of the rotating body. In addition, if electronic devices and sensors carried by the rotating body require electrical power for operation, and the sensors generate data signals, it may be beneficial to transfer electrical power to the rotating body and data signals from the sensors associated with the rotating body to a non-rotating body. However, rotation of the rotating body may prevent the use of hard-wired connections between the rotating body and the non-rotating body.

For example, a rotating body may include one or more sensors generating data signals in the form of sensor signals. Operation of the one or more sensors may require electrical power, and thus, it may be necessary to transfer electrical power from a non-rotating body coupled to an electrical power source to the one or more sensors carried by the rotating body. In addition, it may be beneficial to control the electrical power transferred to the rotating body in order to provide appropriate power characteristics for the one or more sensors and any other electrically powered devices carried by the rotating body. It may also be beneficial to transfer the sensor signals generated by the one or more sensors to a location remote from the rotating body, such as to a non-rotating body. In addition, for some applications, it may be beneficial to prevent interference from altering or corrupting the power and sensor signals as they are transferred between the non-rotating body and the rotating body.

This disclosure is generally directed to a support assembly for supporting a rotating body having a rotation axis about which it rotates. Some examples of the support assembly may include a first support defining a first longitudinal support axis and configured to support the rotating body, such that the rotating body is rotatable relative to the first support. In some examples, the rotation axis may be transverse to the first longitudinal support axis. The support assembly may also include a second support defining a second longitudinal support axis and configured to support the rotating body, such that the rotating body is rotatable relative to the second support. In some examples, the rotation axis may be transverse to the second longitudinal support axis. The support assembly may also include a spine defining a longitudinal spine axis. The spine may be coupled to the first and second supports, and may extend between the first and second supports. In some examples, the longitudinal spine axis may be transverse to the first and second longitudinal support axes. In some examples, the support assembly may include a motor associated with at least one of the first support or the second support. The motor may be configured to supply torque to rotate the rotating body. In some examples, at least one of the spine, the first support, or the second support may define a recess configured to receive at least one of an electrical conductor or a data signals link associated with operation of the rotating body.

In some examples, the motor may be coupled to the first support and include a drive shaft configured to be coupled to the rotating body to supply torque to the rotating body. In some examples, the motor may be coupled to the first support on a side of the first support adjacent the rotating body. In some examples, the first support may include a first support recess configured to provide a passage between the spine and the motor for receiving an electrical conductor to provide electrical power to the motor.

In some examples, the first and second longitudinal support axes may be parallel to one another. In some examples, the first and second longitudinal support axes may lie in a common plane. In some examples, at least one of the first longitudinal support axis or the second longitudinal support axis may be perpendicular with respect to the longitudinal spine axis. For example, both the first and second longitudinal support axes may be perpendicular with respect to the longitudinal spine axis. In some examples, the spine, the first support, and the second support may be coupled to one another, such that the spine axis is configured to be spaced from and parallel to the rotation axis of the rotating body.

In some examples, at least one of the first support or the second support may include a bearing configured to facilitate rotation of the rotating body. For example, at least one of the first support or the second support may include a bore that receives a bearing.

In some examples, the spine may define a recess configured to receive at least one of the electrical conductor, the data signals link, or electronic circuitry related to operation of the rotating body. For example, the spine may define a recess on a side of the spine opposite the first and second supports. In some examples, the spine may include one or more apertures configured to provide passages for receiving one or more of the electrical conductor and the data signals link in the recess. In some examples, the one or more apertures may be aligned with at least one of the first support or the second support to provide respective passages from the first and second supports to the recess of the spine. Some examples may include a cover configured to cover the recess of the spine. In some examples, the cover may include one or more cover passages configured to provide a passage from the recess of the spine to exterior the cover. In some examples, these passages may facilitate transfer of electrical power and/or data signals between the support assembly and other portions of a machine, such as, for example, a vehicle.

In some examples, at least one of the first support or the second support may define a support recess configured to receive at least one of the electrical conductor or the data signals link. For example, both the first and second supports may define respective support recesses. In some examples, the support recesses may provide a passage for at least one of the electrical conductor or the data signals link to pass from the respective support recess to the recess of the spine.

In some examples, the support assembly may also include a third support associated with the spine, such that the third support is spaced from and on a side of the second support opposite the first support. For example, the third support may be coupled to the spine and may define a third longitudinal support axis transverse to the longitudinal spine axis. In some examples, the second longitudinal support axis and the third longitudinal support axis may be parallel to one another. In some examples, the third support may define a support recess configured to receive at least one of an electrical conductor and a data signals link. In some examples, the support recess of the third support may provide a passage for at least one of the electrical conductor or the data signals link to pass from the support recess of the third support to the recess of the spine.

This disclosure is also generally directed to a system including a rotating body defining a rotational axis and configured to support at least one sensor configured to generate sensor signals. The system may also include a support assembly coupled to and supporting the rotating body, such that the rotating body rotates about the rotational axis. The support assembly may include a first support defining a first longitudinal support axis and supporting the rotating body, such that the rotating body is rotatable relative to the first support. In some examples, the rotation axis may be transverse to the first longitudinal support axis. The support assembly may also include a second support defining a second longitudinal support axis and supporting the rotating body, such that the rotating body is rotatable relative to the second support. In some examples, the rotation axis may be transverse to the second longitudinal support axis. The support assembly may also include a spine defining longitudinal spine axis, with the spine being coupled to the first and second supports, and extending between the first and second supports. In some examples, the longitudinal spine axis may be transverse to the first and second longitudinal support axes. In some examples, the support assembly may include a motor associated with at least one of the first support or the second support, and the motor may be configured to supply torque to rotate the rotating body.

In some examples, the system may also include a second bearing associated with the second support, and configured to facilitate rotation of the rotating body. For example, the rotating body may include a stub received by the second bearing, such that the second bearing and the stub facilitate rotation of the rotating body. In some examples, the system may also include an adapter coupled to the stub on a side of the second support opposite the rotating body, such that the adapter rotates with the rotating body. In some examples, the second bearing may be part of the motor.

In some examples, the system may also include an interface including a first interface portion coupled to the adapter and configured to transfer at least one of power or data signals between the rotating body and a second interface portion. For example, the system may include at least one of an electrical conductor or a data signals link coupled to the first interface portion and passing through the second bearing between the rotating body and the first interface portion.

In some examples, the system may also include a third support associated with the spine, such that the third support is spaced from and on a side of the adapter opposite the second support. In some examples, the system may include a second interface portion coupled to the third support and configured to transfer at least one of electrical power or data signals between the third support and the first interface portion. In some examples, the third support may define a support recess configured to receive at least one of an electrical conductor or a data signals link configured to transfer at least one of electrical power or data signals between the spine and the second interface portion. For example, the support recess of the third support may provide a passage for at least one of the electrical conductor or the data signals link to pass from the second interface to the recess of the spine.

In some examples, the support assembly and the system including a rotating body and the support assembly may be used with a vehicle to provide for transfer of electrical power and/or data signals between the vehicle and one or more sensors carried by the rotating body. For example, respective interface portions may be configured to be coupled to a non-rotating body, such as a support, coupled to the vehicle and to the rotating body. The interface portions may be configured to transfer electrical power to the one or more sensors and other electrically-powered devices carried by the rotating body. The interface portions may also be configured to transfer sensor signals in the form of data signals from the one or more sensors carried by the rotating body to the support, for example, so that a controller of the vehicle may incorporate the sensor signals into a strategy for controlling an aspect of operation of the vehicle. This is merely an example use, and other suitable uses are contemplated.

In some examples, the interface may include a power transfer device coupled to the third support and configured to transfer electrical power, and a power receiver coupled to the rotating body and configured receive electrical power from the power transfer device via a wireless coupling. The interface may further include a first data transmitter coupled to the rotating body and configured to transmit data signals, and a first data receiver coupled to the non-rotating body and configured to receive data signals from the first data transmitter via a wireless coupling. The interface may also include a second data transmitter coupled to the non-rotating body and configured to transmit data signals, and a second data receiver coupled to the rotating body and configured to receive data signals from the second data transmitter via a wireless coupling.

In some examples, the power transfer device and the power receiver may each include an inductive coil, and the wireless coupling between the power transfer device and the power receiver may include an inductive coupling. In some examples, the power transfer device and the power receiver may be axially aligned with the axis of rotation of the rotating body. In some examples, the first data transmitter and the first data receiver may each include an optical communication device, and the wireless coupling between the first data transmitter and the first data receiver may include an optical coupling. In some examples, the first data transmitter and the first data receiver may be axially aligned with the axis of rotation of the rotating body. In some examples, the second data transmitter and the second data receiver may each include an inductive coil, and the wireless coupling between the second data transmitter and the second data receiver may include an inductive coupling. In some examples, the second data transmitter and the second data receiver may be axially aligned with the axis of rotation of the rotating body. In some examples, the first data transmitter, the first data receiver, the second data transmitter, and the second data receiver may each include an optical communication device. The wireless coupling between the first data transmitter and the first data receiver may include an optical coupling, and the wireless coupling between the second data transmitter and the second data receiver may include an optical coupling. In some examples, the first data transmitter and the second data transmitter may be axially aligned with the axis of rotation of the rotating body, and the first data receiver and the second data receiver may not be axially aligned with the axis of rotation of the rotating body. In other examples, the first data receiver and the second data receiver may be axially aligned with the axis of rotation of the rotating body, and the first data transmitter and the second data transmitter may not be axially aligned with the axis of rotation of the rotating body.

In some examples, the first data transmitter may be configured to send data signals relating to sensor data from the rotating body to the first data receiver. In some examples, the second data transmitter may be configured to send data signals for regulating power to the second data receiver. In some examples, the second data transmitter may be configured to send data signals for controlling operation of the rotating body to the second data receiver.

The techniques and systems described herein may be implemented in a number of ways. Example implementations are provided below with reference to the figures. While certain examples are described herein in the context of a LIDAR sensor, in other examples, the techniques may be applied to transfer data and/or power between stationary (i.e., non-rotating) and rotating components.

FIG. 1 is a partial schematic side section view of an example system 100 including an example rotating body 102 and an example support assembly 104 for supporting the rotating body 102. In the example shown, the rotating body 102 defines a rotational axis X. In some examples, the rotating body 102 may be configured to support at least one sensor configured to generate sensor signals in the form of data signals. In the example system 100 shown, the support assembly 104 is coupled to and supports the rotating body 102, such that the rotating body 102 rotates about the rotational axis X. In some examples, the rotating body 102 may be configured to rotate through an angle of 360 degrees or more in either direction about its axis of rotation X, and in some examples, the rotating body 102 may be configured to rotate through and angle of less than 360 degrees and reverse its direction of rotation about its axis of rotation X. For example, the rotating body 102 may be configured to oscillate about its axis X without completing a 360-degree rotation.

The example support assembly 104 shown in FIG. 1 includes a first support 106 defining a first longitudinal support axis F and supporting the rotating body 102, such that the rotating body 102 is rotatable relative to the first support 106, with the rotation axis X being transverse to the first longitudinal support axis F. The example support assembly 104 also includes a second support 108 defining a second longitudinal support axis S and supporting the rotating body 102, such that the rotating body 102 is rotatable relative to the second support 108, and the rotation axis X is transverse to the second longitudinal support axis S. The example support assembly 104 also includes a spine 110 defining a longitudinal spine axis SP, with the spine 110 being coupled to the first support 106 and the second support 108, and extending between the first support 106 and the second support 108. In some examples, the first support 106 and/or the second support 108 may be integrally formed with the spine 110, thereby coupling the first support 106, the second support 108, and the spine 110 to one another. In the example shown, the longitudinal spine axis SP is transverse to the first longitudinal support axis F and the second longitudinal support axis S.

In the example shown in FIG. 1, the first longitudinal support axis F of the first support 106 and the second longitudinal support axis S of the second support 108 are parallel to one another. Other relative orientations are contemplated. In some examples, the first longitudinal support axis F and the second longitudinal support axis S lie in a common plane. In some examples, the first longitudinal support axis F and the second longitudinal support axis S lie in planes offset from one another. In some examples, the first longitudinal support axis F and the second longitudinal support axis S may be perpendicular with respect to the longitudinal spine axis SP, for example, as shown in FIG. 1. In some examples, one or more of the first longitudinal support axis F and the second longitudinal support axis S may not be perpendicular with respect to the longitudinal spine axis SP of the spine 110.

In the example shown in FIG. 1, the spine 110, the first support 106, and the second support 108 are coupled to one another (e.g., directly coupled to one another), such that the spine axis SP is configured to be spaced from and parallel to the rotation axis X of the rotating body 102. For example, one or more of the first support 106 and the second support 108 may be coupled to the spine 110 via fasteners, such as nuts, bolts, and/or screws, welding, and/or adhesives. For example, the first support 106 and the second support 108 may each include threaded studs extending from respective ends adjacent the spine 110, so that the studs can be received in receiver holes in the spine 110. Nuts may be used to secure the remote ends of the studs in the receiver holes, thereby securing the first and second supports 106 and 108 to the spine 110. In some examples, the first support 106 and/or the second support 108 may be integrally formed with the spine 110, thereby coupling the first support 106, the second support 108, and the spine 110 to one another.

The example system 100 shown in FIG. 1 also includes a motor 112 associated with the first support 106 and coupled to the rotating body 102 to supply torque to rotate the rotating body 102. In some examples, the motor 112 may be associated with the second support 108. In some examples, the motor 112 may be an electric motor. Other types of motors are contemplated. In some examples, at least one of the motor 112 or the first support 106 may include a bearing 114 configured to facilitate rotation of the rotating body 102. For example, the first support 106 may include a bore through the support and receiving the bearing. In some examples, the bearing may be incorporated into the motor 112. In the example shown in FIG. 1, the first support includes a bore 114 through the first support 106, and the motor 112 is coupled to a side of the first support 106 adjacent the rotating body 102. The motor 112 may be coupled to the first support 106 via fasteners, such as nuts, bolts, and/or screws, welding, and/or adhesives.

In the example shown in FIG. 1, the motor 112 includes a drive shaft 116 coupled to a transfer plate 117 configured to transfer torque supplied by the motor 112 to the rotating body 102. The transfer plate 117 may be an integral portion of the rotating body 102, or it may be a separate part coupled to the rotating body 102.

In some examples, the motor 112 may be located remotely from the drive shaft 116, and torque from the motor 112 may be provided by a device for transmitting torque from the motor 112 to the drive shaft 116, such as, for example, one or more gears, one or more shafts, one or more belts, and/or one or more chain drives. In some examples, the motor 112 may be located between the first support 106 and the rotating body 102, for example, as shown in FIG. 1. In some examples, the motor 112 may be located at the other end of the rotating body 102.

In some examples, the rotating body 102 may be associated with one or more electronic devices 118. For example, the electronic devices 118 may be carried by or within the rotating body 102. The electronic devices 118 may include any devices that use electrical power to perform functions, such as, for example, sensors configured to generate sensor signals in the form of data signals, processors configured to manipulate the data signals (e.g., processors that filter, compress, fuse, and/or transform the data signals), and/or controllers to control operation of the sensors and/or the rotating body 102. Other types and functions of electronic devices 118 are contemplated.

In the example shown in FIG. 1, the second support 108 includes a bore 119 through the second support 108, and a bearing 120 is received in the bore 119 and configured to facilitate rotation of the rotating body 102. The example rotating body 102 includes a stub 122 received by the bearing 120, such that the bearing 120 and the stub 122 facilitate rotation of the rotating body 102. In some examples, the motor 112 may be associated with the second support 108 instead of the first support 106, and the bore 119, the bearing 120, and the stub 122 may be associated with the first support 106 instead of the second support 108.

The example system 100 shown in FIG. 1 also includes an interface 124 including a first interface portion 126 and a second interface portion 128, wherein the first interface portion 126 is configured to transfer at least one of power or data signals between the rotating body 102 and the second interface portion 128. For example, as shown, the first interface portion 126 is coupled to an adapter 130. For example, the stub 122 extends through the bearing 120 and the second support 108, and the adapter 130 is coupled to the stub 122 on a side of the second support 108 opposite the rotating body 102, such that the adapter 130 rotates with the rotating body 102. The first interface portion 126 is coupled to the adaptor 130 and configured to transfer at least one of power or data signals between the rotating body 102 and the second interface portion 128.

The example system 100 shown in FIG. 1 also includes a third support 132 associated with the spine 110, such that the third support 132 is spaced from and on a side of the adapter 130 opposite the second support 108. In some examples, the second interface portion 128 is coupled to the third support 132 and configured to transfer at least one of electrical power or data signals between the third support 132 and the first interface portion 126. In the example shown, the second interface portion 128 is coupled to the third support 132 on a side of the third support 132 adjacent the first interface portion 126, with a space between the first interface portion 126 and the second interface portion 128, so that the first interface portion 126 is able to rotate with the rotating body 102, and the second interface portion 128 does not rotate with the rotating body 102. The example third support 132 is coupled to the spine 110 and defines a third longitudinal support axis T transverse to the longitudinal spine axis SP. In some examples, the second longitudinal support axis S and the third longitudinal support axis T are parallel to one another, for example, as shown.

In some examples, the third support 132 may be coupled to the spine 110 via fasteners, such as nuts, bolts, and/or screws, welding, and/or adhesives. For example, the third support 132 may include threaded studs extending from its end adjacent the spine 110, so that the studs can be received in receiver holes in the spine 110. Nuts may be used to secure the remote ends of the studs in the receiver holes, thereby securing the third support 132 directly to the spine 110. In some examples, the third support 132 may be integrally formed with the spine 110, thereby coupling the third support 132 and the spine 110 to one another.

In some examples, at least one of the spine 110, the first support 106, the second support 108, or the third support 132 defines a recess configured to receive at least one of an electrical conductor or a data signals link associated with operation of the rotating body 102. In the example shown, each of the spine 110, the first support 106, and the third support 132 defines a recess. For example, the spine 110 defines a spine recess 134 configured to receive at least one of an electrical conductor, a data signals link, or electronic circuitry related to operation of the rotating body 102. In the example shown, electronic circuitry 136 is received in the spine recess 134. The electronic circuitry 136 may include one or more of printed circuit boards, computer modules, electric power modules, programmable controllers, and/or any other known electronic-related components.

The example first support 106 shown in FIG. 1 defines a first support recess 138 configured to receive an electrical conductor 140 configured to transfer electrical power from the spine 110 to the motor 112. In the example shown, the electrical conductor 140 extends from the electronic circuitry 136 in the spine recess 134, through an aperture 142 in the spine recess 134, and into the first support recess 138 to the motor 112. In this example configuration, operation of the motor 112 may be powered and/or at least partially controlled via the electronic circuitry 136.

The example third support 132 defines a third support recess 144 configured to receive at least one of an electrical conductor or a data signals link 146 configured to transfer at least one of electrical power or data signals between the spine 110 and the second interface portion 128, which may be coupled to the third support 132. In the example shown, electrical conductor or a data signals link 146 extends from the electronic circuitry 136 in the spine recess 134, through an aperture 148 in the spine recess 134, and into the third support recess 144 to the second interface portion 128. In this example configuration, electrical power and/or data signals may be transferred between the electronic circuitry 136 and the second interface portion 128.

In the example in FIG. 1, the stub 122 defines a stub recess 150 providing a passage between the electronic devices 118 carried by the rotating body 102 and the first interface 126. At least one of an electrical conductor or a data signals link 152 configured to transfer at least one of electrical power or data signals between the first interface portion 126 and the rotating body 102 may pass through the stub recess 150 and the bearing 120 from the electronic devices 118 carried by the rotating body 102 to the first interface 126. In this example configuration, electrical power and/or data signals may be transferred between the electronic devices 118 and the first interface portion 126.

In some examples, the second interface portion 128 may include a power transfer device coupled to the third support 132 and configured to transfer electrical power, and the first interface portion 126 may include a power receiver coupled to the rotating body 102 via the stub 122 and adaptor 130 and configured receive electrical power from the power transfer device via a wireless coupling. The first interface portion 126 may also include a first data transmitter coupled to the rotating body 102 via the stub 122 and/or the adaptor 130 and configured to transmit data signals. The second interface portion 128 may include a first data receiver coupled to the third support 132 and configured to receive data signals from the first data transmitter via a wireless coupling. The second interface portion 126 may also include a second data transmitter coupled to the third support 132 and configured to transmit data signals. The first interface portion 126 may include a second data receiver coupled to the rotating body 102 via the stub 122 and/or the adaptor 130 and configured to receive data signals from the second data transmitter via a wireless coupling.

In some examples, the power transfer device and the power receiver may each include an inductive coil, and the wireless coupling between the power transfer device and the power receiver may include an inductive coupling. In some examples, the power transfer device and the power receiver may be axially aligned with the axis of rotation X of the rotating body 102. In some examples, the first data transmitter and the first data receiver may each include an optical communication device, and the wireless coupling between the first data transmitter and the first data receiver may include an optical coupling. In some examples, the first data transmitter and the first data receiver may be axially aligned with the axis of rotation X of the rotating body 102. In some examples, the second data transmitter and the second data receiver may each include an inductive coil, and the wireless coupling between the second data transmitter and the second data receiver may include an inductive coupling. In some examples, the second data transmitter and the second data receiver may be axially aligned with the axis of rotation X of the rotating body 102. In some examples, the first data transmitter, the first data receiver, the second data transmitter, and the second data receiver may each include an optical communication device. The wireless coupling between the first data transmitter and the first data receiver may include an optical coupling, and the wireless coupling between the second data transmitter and the second data receiver may include an optical coupling. In some examples, the first data transmitter and the second data transmitter may be axially aligned with the axis of rotation X of the rotating body 102, and the first data receiver and the second data receiver may be axially offset from the axis of rotation X of the rotating body 102. In other examples, the first data receiver and the second data receiver may be axially aligned with the axis of rotation X of the rotating body 102, and the first data transmitter and the second data transmitter may be axially offset from the axis of rotation X of the rotating body 102.

In some examples, the first data transmitter may be configured to send data signals relating to sensor data from the rotating body to the first data receiver. In some examples, the second data transmitter may be configured to send data signals for regulating power to the second data receiver. In some examples, the second data transmitter may be configured to send data signals for controlling operation of the rotating body to the second data receiver.

In some examples, the power transfer device and the power receiver may each include an inductive coil, and the wireless coupling between the power transfer device and the power receiver may include an inductive coupling. In such examples, the power is transferred from the inductive coil associated with the second interface portion 128 to the inductive coil associated with the first interface portion 126 by electrical induction. In some examples, the power transfer device and the power receiver are axially aligned with the axis X of rotation of the rotating body 102. In some examples, the power transfer device and the power receiver may be a near-field transfer devices. In some examples, the power transfer device and the power receiver may be configured to transfer electrical power ranging from about 15 watts to about 60 watts, or from about 20 watts to about 50 watts, or from about 30 watts to about 40 watts.

In some examples, the first data transmitter and the first data receiver may be configured to wirelessly transfer data signals via a high-speed wireless link (e.g., a wireless link having a data transfer rate of greater than or equal to 50 kilobits per second (kbps)). For example, the first data transmitter and the first data receiver may each include an optical communication device, and the wireless coupling between the first data transmitter and the first data receiver provides an optical coupling. In some examples, the first data transmitter may include an optical transmitter, such as, for example, a light-emitting diode (LED) or a laser diode, and the first data receiver may include an optical receiver, such as, for example, a photo detector. In some examples, the first data transmitter and the first data receiver may be axially aligned with the axis of rotation X of the rotating body 102. In some examples, the first data transmitter and the first data receiver may be transceivers configured to both transmit data and receive data, such as, for example, transceivers that include photodiodes configured to operate in both transmitting and receiving modes, rendering them bi-directional. Other types of high-speed wireless links are contemplated.

In some examples, the second data transmitter and the second data receiver may be configured to provide bi-directional data transfer. For example, the second data transmitter may be configured to receive data, and the second data receiver may be configured to transmit data, thus reversing functions. In some examples, both the second data transmitter and the second data receiver may be configured to send and receive data. In some examples, the second data transmitter and the second data receiver may be configured to wirelessly transfer data signals via a low-speed wireless link (e.g., a wireless link having a data transfer rate of less than 20 kbps). In some examples, the second data transmitter and the second data receiver may be configured to wirelessly transfer data signals via a medium-speed wireless link (e.g., a wireless link having a data transfer rate ranging from about 25 kbps to about 30 kbps (e.g., about 28 kbps)). For example, the second data transmitter and the second data receiver each include an inductive coil, and the wireless coupling between the second data transmitter and the second data receiver provides an inductive coupling. The second data transmitter and the second data receiver may be axially aligned with the axis of rotation X of the rotating body 102. Other types of low-speed and medium-speed wireless links are contemplated.

In some examples, the second data transmitter and the second data receiver may be configured to wirelessly transfer data signals via a high-speed wireless link (e.g., a wireless link having a data transfer rate of greater than or equal to 50 kilobits per second (kbps)). For example, the second data transmitter and the second data receiver may each include an optical communication device, and the wireless coupling between the second data transmitter and the second data receiver provides an optical coupling. In some examples, the second data transmitter may include an optical transmitter, such as, for example, an LED or a laser diode, and the second data receiver may include an optical receiver, such as, for example, a photo detector. In some examples, the second data transmitter and the second data receiver may be axially aligned with the axis of rotation X of the rotating body 102. Other types of high-speed wireless links are contemplated.

In some examples, the first data transmitter, the first data receiver, the second data transmitter, and the second data receiver may be configured to wirelessly transfer data signals via a high-speed wireless link. For example, the first data transmitter, the first data receiver, the second data transmitter, and the second data receiver each include an optical communication device, the wireless coupling between the first data transmitter and the first data receiver provides an optical coupling, and the wireless coupling between the second data transmitter and the second data receiver provides an optical coupling. In some examples, the first data transmitter and the second data transmitter may each include an optical transmitter, such as, for example, an LED or a laser diode, and the first data receiver and the second data receiver may each include an optical receiver, such as, for example, a photo detector. In some examples, the first data transmitter, the first data receiver may be configured to provide uni-directional data transfer, and the second data transmitter and the second data receiver may be configured to provide uni-directional data transfer. In some examples, the first data transmitter, the first data receiver, the second data transmitter, and the second data receiver may be transceivers configured to both transmit data and receive data, such as, for example, transceivers that include photodiodes configured to operate in both transmitting and receiving modes, rendering them bi-directional.

In some examples, the interface 124 may be resistant to interference with the power transfer and/or the data transfer that might otherwise alter, corrupt, or block the power and/or data transfer. This may be beneficial when the interface 124 is used in association with devices or machines for which interruption of the power and/or data transfer may be particularly undesirable. For example, in machines that operate with little or no human control, interruption of the transfer of power and/or data to a part of the machine may contribute to the occurrence of an accident. For example, for an autonomous vehicle having little or no human control, sensors may be used to assist with guidance and/or object avoidance. If data signals from those sensors are interrupted, for example, via a loss of power used to operate the sensors and/or corruption or interruption of the data signals generated by the sensors and used by the vehicle as part of a vehicle control strategy, such occurrences may increase the likelihood of an accident. Thus, in such uses it may be beneficial for the interface 124 to be resistant to interference with the power transfer and/or the data transfer that might otherwise alter, corrupt, or block the power and/or data transfer, regardless of whether such interference is accidental or intentional.

As shown in FIG. 1, some examples may include a cover 154 configured to cover the spine recess 134. In some examples, the cover 154 may include one or more cover passages 156 configured to provide a passage from the spine recess 134 to exterior the cover 154. In some examples, these passages may facilitate transfer of electrical power and/or data signals between the support assembly 104 and other portions of a machine, such as, for example, a vehicle.

The example system 100 and support assembly 104 shown in FIG. 1 may be incorporated into a sensor assembly. For example, FIGS. 2-8 schematically depict an example sensor assembly 200 configured to generate sensor data in the form of data signals, and transmit the data signals from the sensor assembly 200 to one or more processors for use of the data signals.

The example sensor assembly 200 shown in FIGS. 2-8 includes light detection and ranging (LIDAR) sensors configured to sense objects in an environment surrounding the sensor assembly 200. In some examples, a LIDAR sensor emits pulses of laser light and estimates to the distance between the sensor and an object in the environment surrounding the sensor based on the time for a reflected return light signal to reach the sensor. The example sensor assembly 200 shown in FIGS. 2-8 may include different or additional types of sensors.

Figure 2:
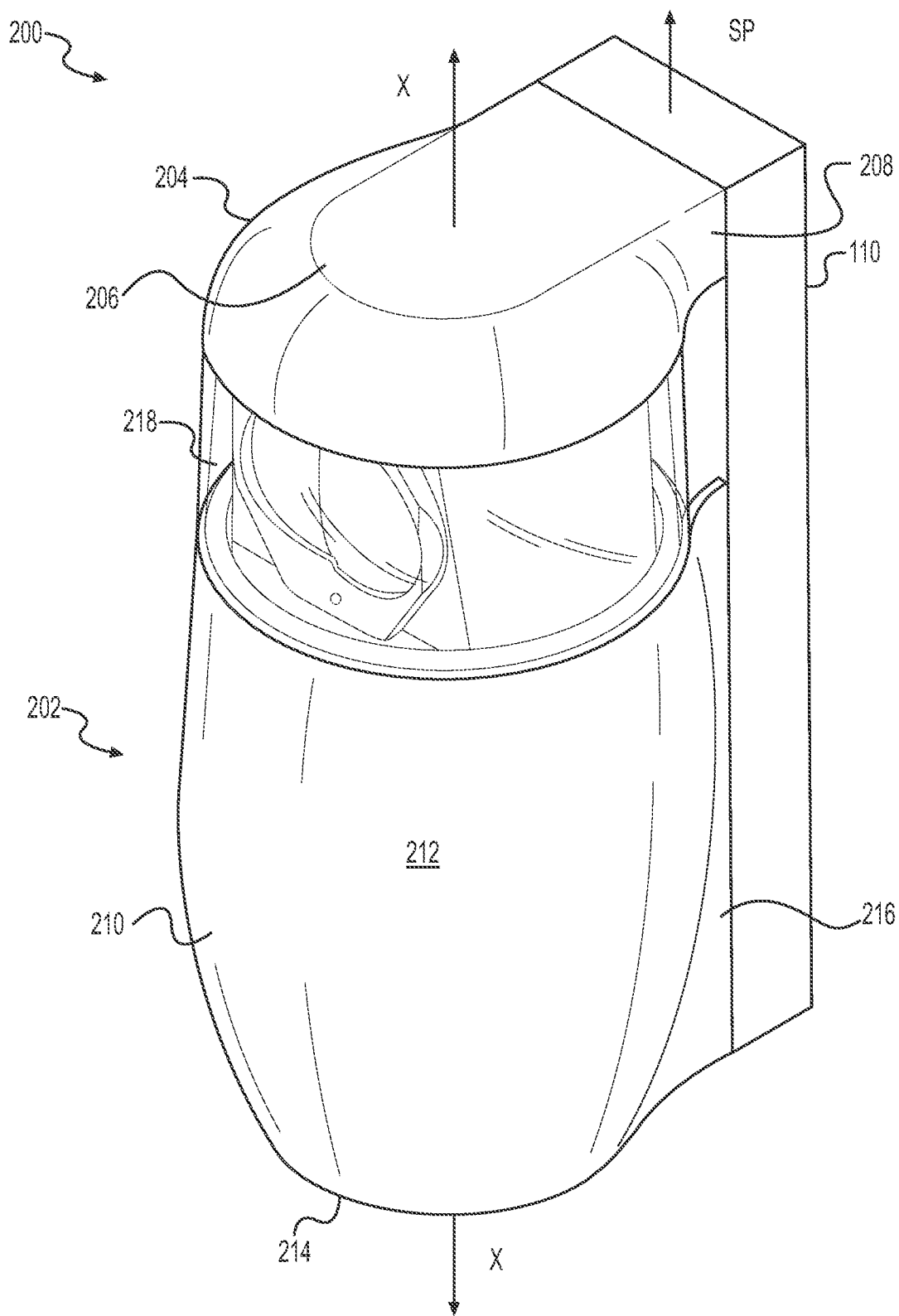
FIG. 2 is a schematic perspective view of an example system including a sensor assembly.

As shown in FIGS. 2-8, the example sensor assembly 200 includes a spine 110 configured to couple the sensor assembly 200 to a platform, such as, for example, a vehicle for which the sensor signals may be used. In some examples, referring to FIG. 2, the sensor assembly 200 may include a protective casing 202 configured to protect the sensor assembly 200 from environmental elements and/or provide a specified design appearance. For example, as shown in FIG. 2, the example protective casing 202 includes a first shell portion 204 coupled to the spine 110. The example first shell portion 204 includes a hat-shaped portion 206 configured to cover an upper end (i.e., in the orientation depicted) of the rotating body 102 of the sensor assembly 200, and an extension 208 configured to extend to the spine 110. The example protective casing 202 also includes a second shell portion 210 coupled to a third support 132 (see FIG. 6) and/or the spine 110. The example second shell portion 210 includes a hollow cylindrical portion 212 having a closed end 214 and an open side 216 configured to fit around the rotating body 102 of the sensor assembly 200. The example protective casing 202 also includes a lens 218 coupled to the spine 110 and the first and second shell portions 204 and 210. For example, the lens 218 may be coupled to the protective casing 202, which may be coupled to the spine 110. In some examples, the lens 218 may be coupled directly to the spine 110, for example, without being coupled to the protective casing 202. The example lens 218 is ring-shaped and facilitates the passage of light to and from the sensor assembly 200 as the rotating body 102 of the sensor assembly 200 rotates within the protective casing 202. One or more O-rings (not shown) may be provided between the first shell portion 204 and the lens 218, and/or between the lens 218 and the second shell portion 210, where the first shell portion 204, the lens 218, and the second shell portion 210 meet one another, in order to prevent dirt and moisture from entering the protective casing 202. Gaskets and/or sealants may be provided between one or more of the first shell portion 204, the lens 218, and the second shell portion 210, and the spine 110 in order to prevent dirt and moisture from entering the protective casing 202.

Figure 3:
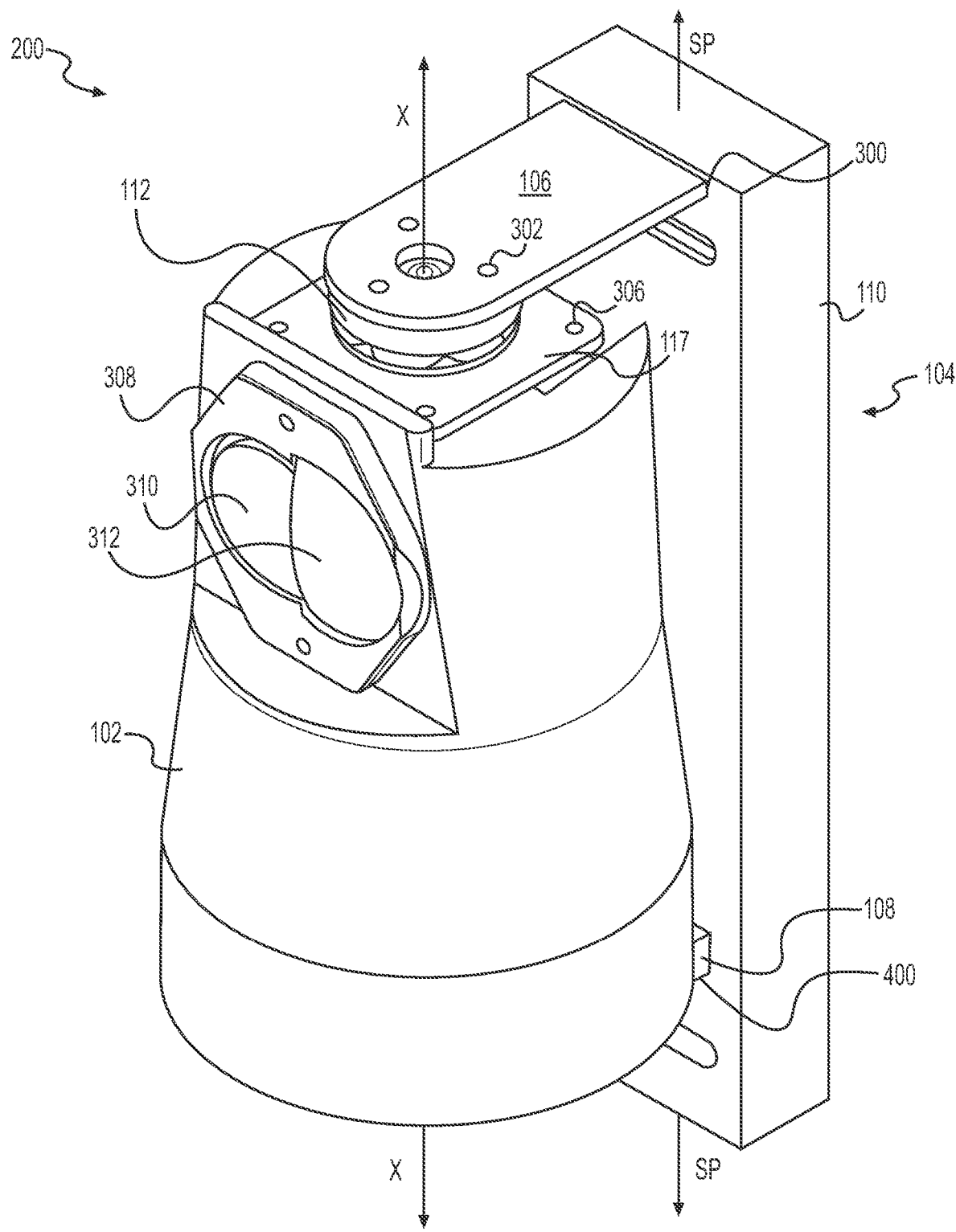
FIG. 3 is a schematic perspective view of a portion of the example sensor assembly shown in FIG. 2.

As shown in FIG. 3, the example sensor assembly 200 also includes a first support 106 coupled to the spine 110, for example, in a cantilever configuration. For example, the spine 110 may include a slot 300 in (or adjacent) which an end of the first support 106 is received. Fasteners, welds, and/or adhesives may be used to secure the first support 106 in or adjacent the slot 300. The example sensor assembly 200 also includes a motor 112 coupled to the first support 106, for example, via one or more fasteners 302. The motor 112, in turn, is coupled to a rotating body 102 of the sensor assembly 200 via a transfer plate 117 and one or more fasteners 306. The transfer plate 117 is configured to transfer torque from the motor 112 to the rotating body 102, so that the rotating body 102 rotates about its axis of rotation X.

In the example sensor assembly 200 shown, the rotating body 102 body serves as a substantially hollow housing for carrying electronic devices including components of the LIDAR sensors. For example, the rotating body 102 may carry one or more of laser boards 400 (see FIG. 4) configured to emit laser light, a detector board (not shown) for detecting the return laser signals reflected from an object in the environment surrounding the sensor assembly 200, and one or more reflectors (not shown) configured to deflect the emitted laser light and/or the return signals, and electronic circuitry (not shown) to provide electrical power and control for operation of the sensor assembly 200. In addition, the example sensor assembly 200 also includes a lens housing 308 configured to couple two lenses 310 and 312 to the rotating body 102. The lenses 310 and 312 are configured to focus the emitted laser light and the return signals for detecting objects in the environment surrounding the sensor assembly 200.

Figure 4:
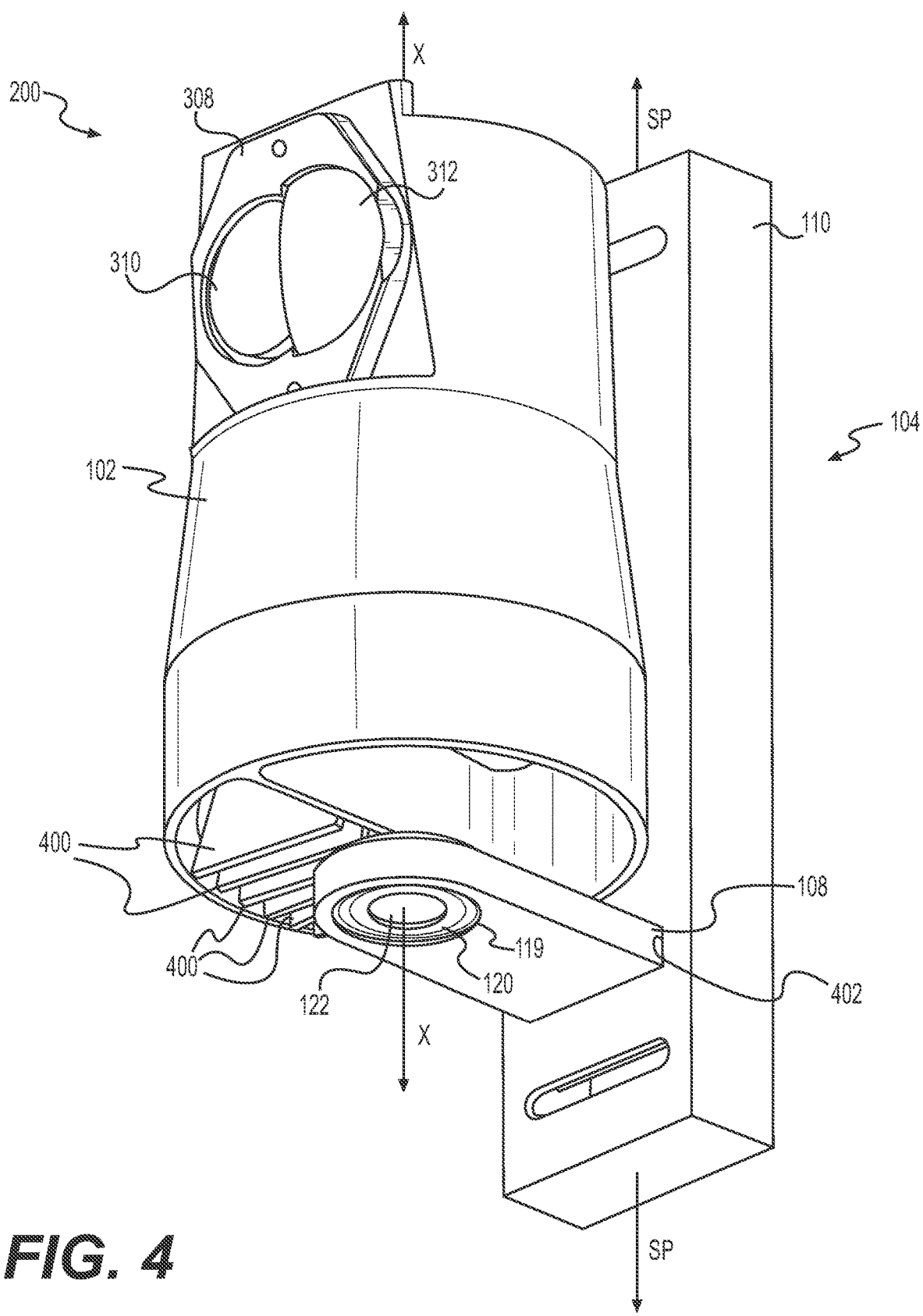
FIG. 4 is a schematic perspective view of a portion of the example sensor assembly shown in FIG. 3 shown from a different angle.

As shown in FIG. 4, the example sensor assembly 200 also includes a second support 108 coupled to the spine 110, for example, in a cantilever manner. For example, the spine 110 includes a second slot 402 in (or adjacent) which the second support 108 is received. Fasteners, welds, and/or adhesives may be used to secure the second support 108 in or adjacent the second slot 402. The example second support 108 may include a bore 119 receiving a bearing 120, and the rotating body 102 may include a stub 122 received by the bearing 120, such that the stub 122 and the rotating body 102 rotate with the bearing 120. In the example shown, the second support 108, the bearing 120, the motor 112, and the second support 108 facilitate rotation of the rotating body 102 about the axis of rotation X. As a result of this example configuration, the laser light emitted from the sensor assembly 200 may be directed through a 360-degree sweep of the surrounding environment for detection of objects in the surrounding environment (not including the portion of the 360-degrees blocked by the spine 110).

Figure 5:
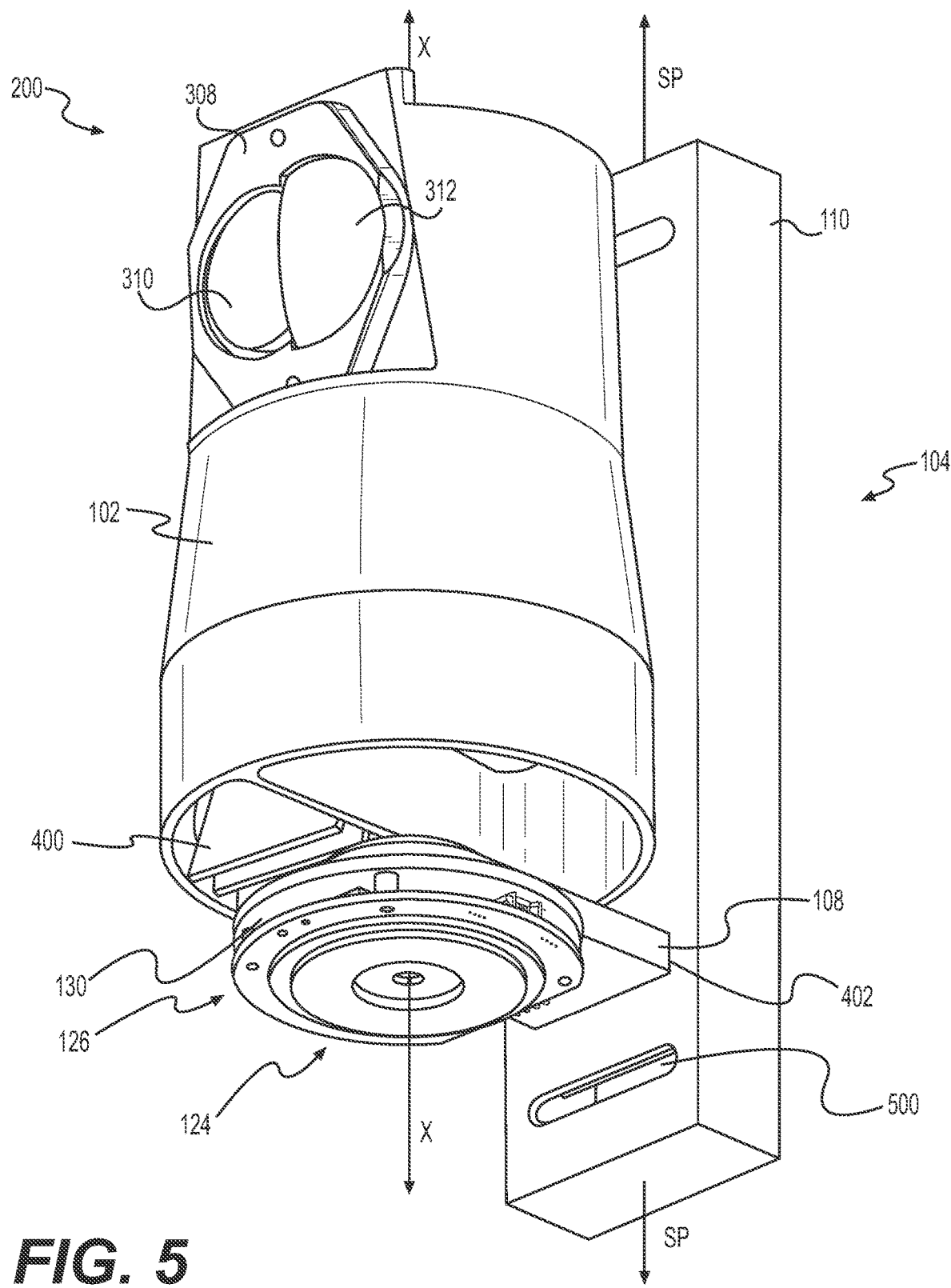
FIG. 5 is a schematic perspective view of a portion of the example sensor assembly shown in FIG. 2, including a portion of an example interface, shown from the same angle as FIG. 4.
Figure 6:
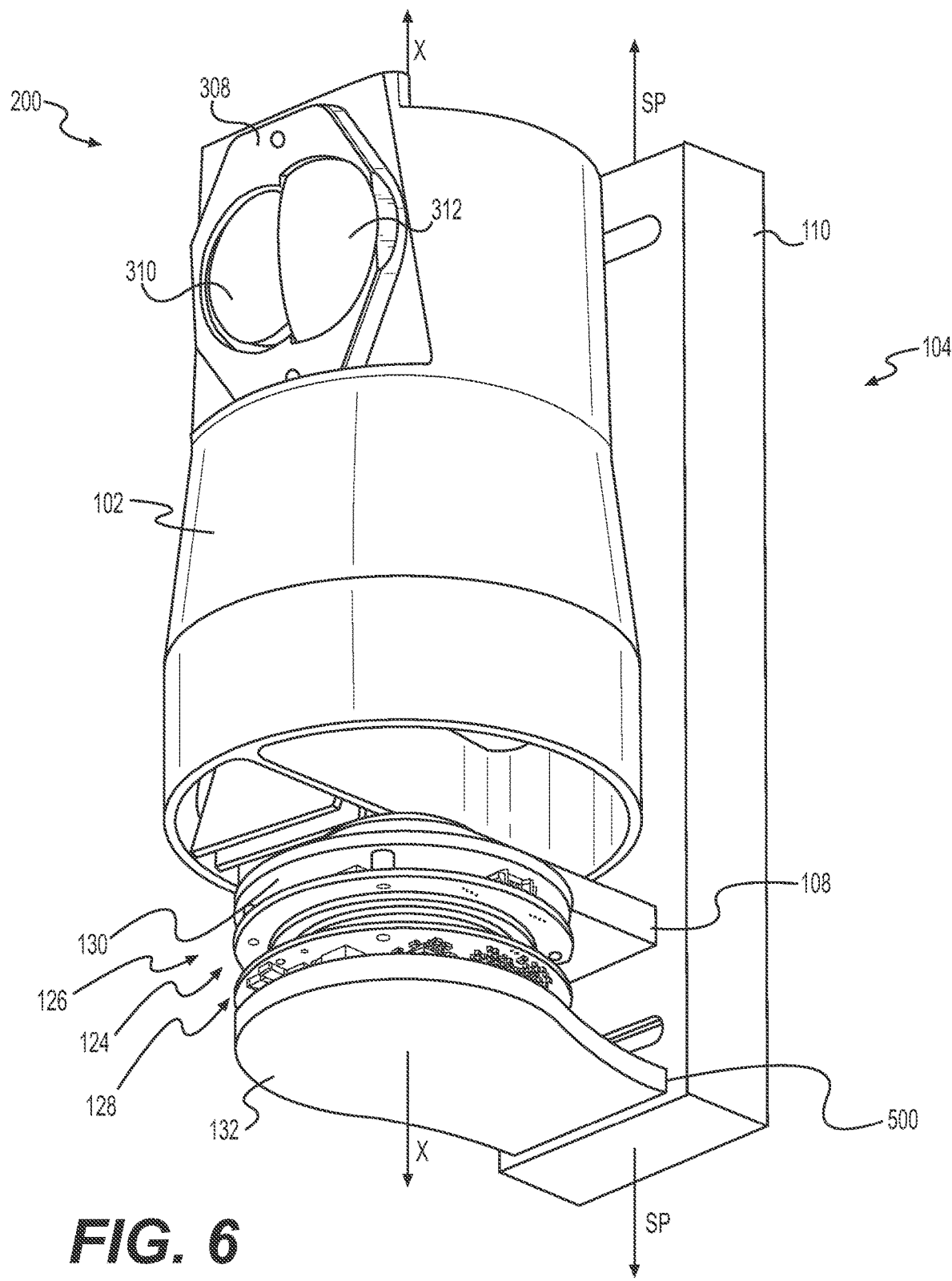
FIG. 6 is a schematic perspective view of a portion of the example sensor assembly shown in FIG. 2, including the example interface shown from the same angle as FIG. 4.

As shown in FIGS. 5 and 6, the example sensor assembly 200 includes an interface 124 for transferring power and data between a non-rotating body in the form of a third support 132 (see FIG. 6) and the rotating body 102. For example, as shown in FIG. 6, the example sensor assembly 200 includes a third support 132 coupled to the spine 110, for example, in a cantilever manner. For example, the spine 110 includes a third slot 500 (see FIG. 5), in (or adjacent) which the third support 132 is received. The third slot 500 may provide an aperture 148 providing a passage between a recess 144 in the third support 132 and the spine recess 134 (see FIG. 1). Fasteners, welds, and/or adhesives may be used to secure the third support 132 in or adjacent the third slot 500. The spine 110 may be coupled to, for example, a vehicle that uses the sensor assembly 200 to detect objects surrounding the vehicle. In some examples, the third support recess 144 may provide a passage for routing electrical conductors and or data links 146 in the form of, for example, fiber optics, wires, and/or cables, between the third support 132 and control and/or power systems of the vehicle. In some examples, a power system of the vehicle may supply electrical power to the wires and/or cables received by the spine 110 and/or the third support 132. In some examples, a control system of the vehicle may provide control signals to the fiber optics, wires, and/or cables received by the spine 110 and/or the third support 132. In some examples, the data signals received by the third support 132 from the rotating body 102, may be supplied to the control systems of the vehicle by the fiber optics, wires, and/or cables. In this example manner, electrical power may be supplied to the third support 132, data signals may be supplied from the vehicle to the third support 132, and/or data signals from the rotating body 102 of the sensor assembly 200 may be supplied via the third support 132 to the control systems of the vehicle.

As shown in FIGS. 5 and 6, the example interface 124 includes a first interface portion 126 coupled to the rotating body 102 via an adapter 130, and a second interface portion 128 coupled to the third support 132 (see FIG. 6). For example, the second interface portion 128 may include a power transfer device coupled to the third support 132 and configured to transfer electrical power, and the first interface portion 126 may include a power receiver coupled to the rotating body 102 and configured to receive electrical power from the power transfer device via a wireless coupling. The example first interface portion 126 may also include a first data transmitter coupled to the rotating body 102 of the sensor assembly 200 and configured to transmit data signals, and the second interface portion 128 may include a first data receiver coupled to the third support 132 and configured to receive data signals from the first data transmitter via a wireless coupling.

Figure 7:
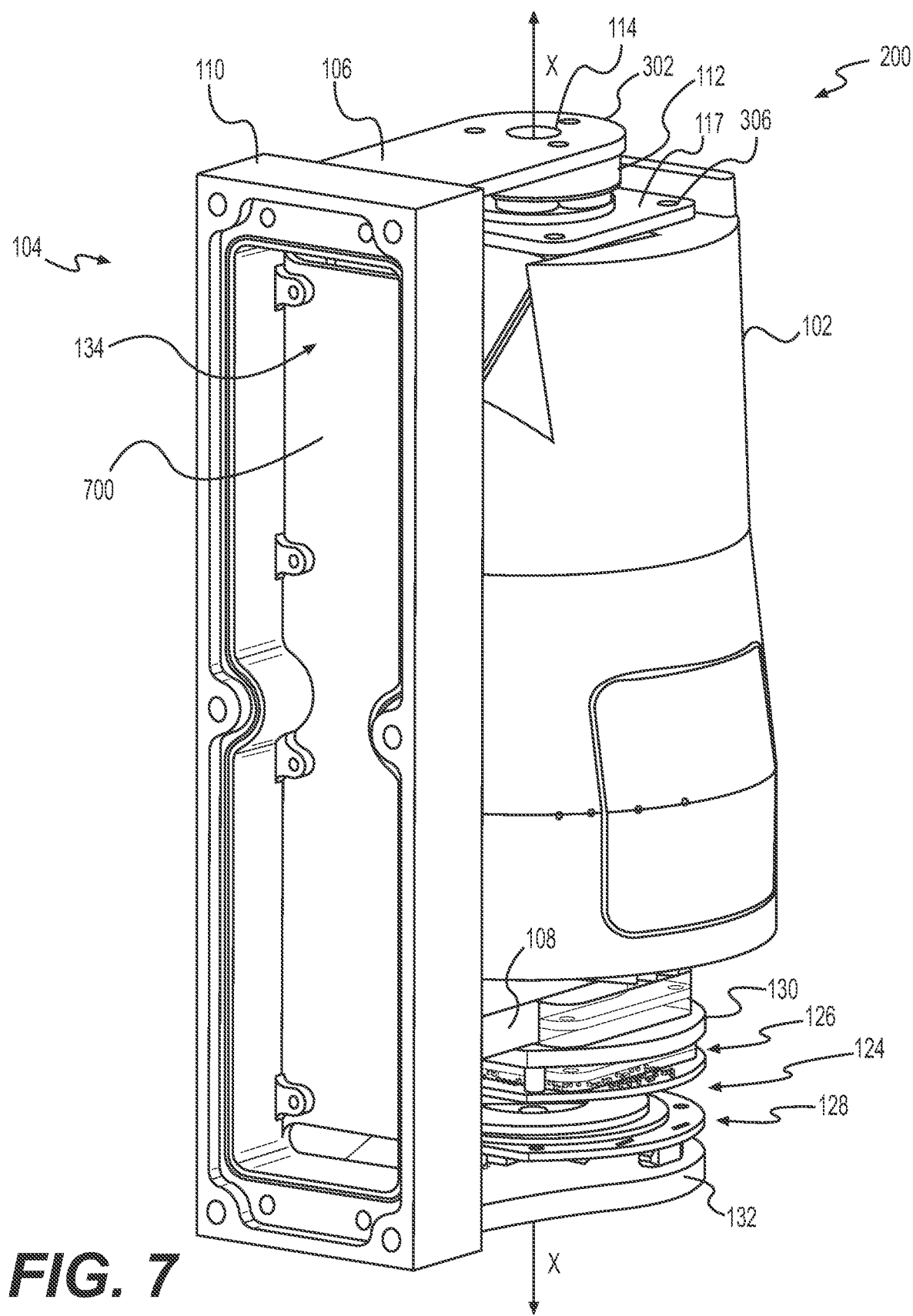
FIG. 7 is a schematic perspective view of the example sensor assembly shown in FIG. 6 shown from a reverse angle.

In the example shown in FIGS. 5-7, the power transfer device and the power receiver may each include an inductive coil, and the wireless coupling between the power transfer device and the power receiver may provide an inductive coupling. In some examples, the power receiver may be coupled to the rotating body 102 of the sensor assembly 200 by the adapter 130, for example, as shown in FIGS. 5 and 6. The example adapter 130 may be coupled to the stub 122 of the rotating body 102, for example, so that the adapter 130 is on a side of the second support 108 opposite the rotating body 102 of the sensor assembly 200, with the power receiver being on a side of the adapter 130 opposite the second support 108.

In some examples, the power transfer device of the second interface portion 128 and the power receiver of the first interface portion 126 may be substantially axially aligned with the axis of rotation X of the rotating body 102 (e.g., within technical tolerances), and thus, the respective inductive coils of the power transfer device and the power receiver are axially aligned with one another. In some examples, the power transfer device and the power receiver may also include electronic circuitry, for example, in the form of programmable circuit boards, configured to control operation of the inductive coils. In this example configuration, electrical power may be transmitted wirelessly via induction from a power source associated with the vehicle to the electrically powered devices carried by the rotating body 102.

The example first data transmitter of the first interface portion 126 shown in FIGS. 5 and 6 is configured to send data signals relating to sensor data from the rotating body 102 of the sensor assembly 200 to the first data receiver of the second interface portion 128. For example, sensor signals in the form of data signals from the LIDAR sensors may be wirelessly transmitted by the first data transmitter to the first data receiver, so that the data signals may be transmitted from the sensor assembly 200 to one or more controllers of the vehicle. In some examples, the first data transmitter and the first data receiver may be configured to wirelessly transfer data signals via a high-speed wireless link (e.g., a wireless link having a data transfer rate of greater than or equal to 50 kbps). For example, the first data transmitter and the first data receiver may each include an optical communication device, and the wireless coupling between the first data transmitter and the first data receiver provides an optical coupling. In some examples, the first data transmitter may include an optical transmitter, such as, for example, an LED or a laser diode, and the first data receiver may include an optical receiver, such as, for example, a photo detector. In some examples, the first data transmitter and the first data receiver may be axially aligned with the axis of rotation X of the rotating body 102. In this example configuration, data signals may be transmitted wirelessly from the LIDAR sensors and electronics carried by the rotating body 102 of the sensor assembly 200 to one or more controllers associated with the vehicle. Other types of high-speed wireless links are contemplated.

The example second interface portion 128 of the interface 124 may also include a second data transmitter coupled to the third support 132 and configured to transmit data signals, and the example first interface portion 126 may include a second data receiver coupled to the rotating body 102 of the sensor assembly 200 and configured to receive data signals from the second data transmitter via a wireless coupling. In some examples, the second data transmitter is configured to send data signals for regulating power supplied to the electronic devices, including components of the LIDAR sensors carried by the rotating body 102, to the second data receiver. In some examples, the second data transmitter is configured to send data signals for controlling operation of the rotating body 102 of the sensor assembly 200 to the second data receiver, such as, for example, control signals related to controlling rotation of the rotating body 102 of the sensor assembly 200 via control of the motor 112.

In some examples, the second data transmitter and the second data receiver may be configured to wirelessly transfer data signals via a low-speed wireless link (e.g., a wireless link having a data transfer rate of less than 50 kbps). For example, the second data transmitter and the second data receiver may each include an inductive coil, and the wireless coupling between the second data transmitter and the second data receiver may provide an inductive coupling. In some examples, the second data transmitter and the second data receiver may be axially aligned with the axis of rotation X of the rotating body 102. Other types of low-speed wireless links are contemplated.

In some examples, the first data transmitter, the first data receiver, the second data transmitter, and the second data receiver may be configured to wirelessly transfer data signals via a high-speed wireless link. For example, the first data transmitter, the first data receiver, the second data transmitter, and the second data receiver may each include an optical communication device, the wireless coupling between the first data transmitter and the first data receiver may provide an optical coupling, and the wireless coupling between the second data transmitter and the second data receiver may provide an optical coupling. In some examples, the first data transmitter and the second data transmitter may each include an optical transmitter, such as, for example, an LED or a laser diode, and the first data receiver and the second data receiver may each include an optical receiver, such as, for example, a photo detector.

In some examples of the sensor assembly 200, the respective inductive coils of the second data transmitter and the second data receiver of the sensor assembly 200 may be replaced by respective optical communication devices. In such examples, the first data transmitter and the second data transmitter may be axially aligned with the axis of rotation X of the rotating body 102 of the sensor assembly 200, and the first data receiver and the second data receiver may not be axially aligned with the axis of rotation X of the rotating body 102. For example, the first data transmitter may be associated with the rotating body 102, such that it is located on the axis of rotation X, and the first data receiver is associated with the third support 132, such that it is not located on the axis of rotation X. However, the first data receiver, which is stationary, may be oriented such that it receives the data signals (e.g., optical data signals) from the first data transmitter as the first data transmitter rotates with the rotating body 102 of the sensor assembly 200. The second data receiver, which may revolve about and be spaced from the axis X of the rotating body 102 as the rotating body 102 rotates, may be oriented such that it receives the data signals (e.g., optical data signals) from the second data transmitter, which is stationary. In some examples, one or more of the first data transmitter, the first data receiver, the second data transmitter, and the second data receiver may be supplemented with reflectors and/or lenses to assist with maintaining the communication link between the first data transmitter and the first data receiver, and/or the communication link the between the second data transmitter and the second data receiver. In some examples, cross-talk or interference between the first data transmitter and the first data receiver pair, and between the second data transmitter and the second data receiver pair, may be mitigated or eliminated via, for example, time sharing techniques and/or by use of bandpass filtering and differences in the communication signals of the pairs (e.g., different frequencies and/or wavelengths of the signals between the pairs). Other techniques are contemplated. In some examples, the first data receiver and the second data receiver may be axially aligned with the axis of rotation X of the rotating body 102 of the sensor assembly 200, and the first data transmitter and the second data transmitter may not be axially aligned with the axis of rotation X of the rotating body 102.

Figure 8:
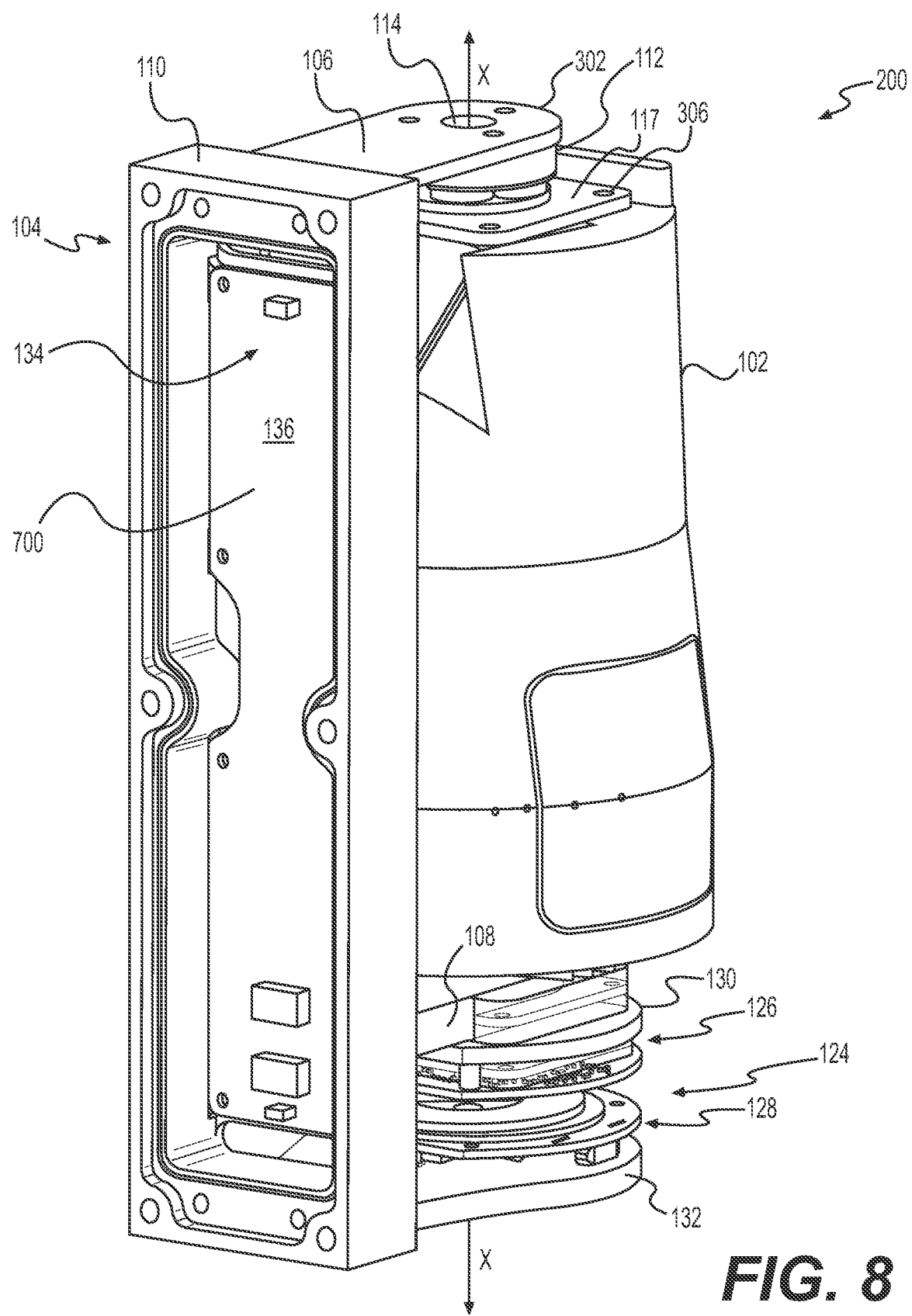
FIG. 8 is a schematic perspective view of the example sensor assembly shown in FIG. 7 with example electronic circuitry.

As shown in FIGS. 7 and 8, the example spine 110 of the sensor assembly 200 includes a spine recess 134 configured to receive at least one of an electrical conductor, a data signals link, or electronic circuitry related to operation of the rotating body 102. For example, as shown in FIG. 7, the spine recess 134 provides a cavity 700 for receiving an electrical conductor, a data signals link, and/or electronic circuitry. As shown in FIG. 8, the example sensor assembly 200 includes electronic circuitry 136 received in the cavity 700. The example electronic circuitry 136 may include one or more of printed circuit boards, computer modules, electric power modules, programmable controllers, and/or any other known electronic-related components. For example, the electronic circuitry 136 may include printed circuit boards, computer modules, electric power modules, and/or programmable controllers associated with operation of electronic devices carried by the rotating body 102.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A support assembly for supporting a rotating body, the support assembly defining a rotation axis about which the rotating body rotates, the support assembly comprising:
   a first support, wherein the rotation axis is transverse to a surface of the first support;
   a second support, wherein the rotation axis is transverse to a surface of the second support;
   a spine coupled to the first support and the second support in a non-rotating manner relative to the first support and the second support, wherein the spine is transverse to the surface of the first support and the surface of the second support, and wherein the spine is coupled to the first support at a first axial end of the first support;
   a motor coupled to at least one of the first support or the second support, and configured to supply torque to rotate the rotating body; and
   an adapter disposed on a side of the second support opposite the first support, wherein the adapter receives a stub of the rotating body.

2. The support assembly of claim 1, wherein the spine defines a recess configured to receive at least one of an electrical conductor or a data signals link associated with the motor.

3. The support assembly of claim 1, wherein at least one of the first support or the second support defines a recess configured to receive at least one of an electrical conductor or a data signals link associated with the motor.

4. The support assembly of claim 1, further comprising:
   a first bearing disposed on at least one of the first support or the motor, and configured to facilitate rotation of the rotating body; and
   a second bearing disposed on at least one of the second support or the motor, and configured to facilitate rotation of the rotating body.

5. The support assembly of claim 1, wherein the motor is coupled between the rotating body and at least one of the first support or the second support.

6. The support assembly of claim 1, further comprising:
   an interface coupled to the adapter and configured to transfer at least one of power signals or data signals to the rotating body.

7. The support assembly of claim 1, wherein the spine defines a spine axis that is spaced from and substantially parallel to the rotation axis about which the rotating body rotates.

8. A support assembly for supporting a rotating body, the support assembly defining a rotation axis about which the rotating body rotates, the support assembly comprising:
   a first support defining a first support axis, wherein the rotation axis is transverse to a surface of the first support;
   a second support defining a second support axis, wherein the rotation axis is transverse to a surface of the second support;
   a spine coupled to the first support and the second support in a non-rotating manner relative to the first support and the second support, wherein the spine is transverse to the first support axis and the second support axis; and
   a motor coupled between the first support and the rotating body, and configured to supply torque to rotate the rotating body.

9. The support assembly of claim 8, wherein the spine defines a recess configured to receive at least one of an electrical conductor or a data signals link associated with the motor.

10. The support assembly of claim 8, wherein at least one of the first support or the second support defines a recess configured to receive at least one of an electrical conductor or a data signals link associated with the motor.

11. The support assembly of claim 8, further comprising:
    a first bearing, disposed on the first support, configured to facilitate rotation of the rotating body; and
    a second bearing, disposed the second support, configured to facilitate rotation of the rotating body.

12. The support assembly of claim 8, further comprising:
    an adapter disposed on a side of the second support opposite the first support, wherein the adapter receives a stub of the rotating body; and
    an interface coupled to the adapter and configured to transfer at least one of power signals or data signals to the rotating body.

13. The support assembly of claim 8, wherein the spine defines a spine axis that is spaced from and substantially parallel to the rotation axis about which the rotating body rotates.

14. The support assembly of claim 8, wherein the spine is coupled to the first support at a first axial end of the first support, and is coupled to the second support at a second axial end of the second support.

15. A support assembly for supporting a rotating body, the support assembly defining a rotation axis about which the rotating body rotates, the support assembly comprising:
    a first support defining a first support axis, wherein the rotation axis is transverse to a surface of the first support axis;
    a second support defining a second support axis, wherein the rotation axis is transverse to a surface of the second support axis;
    a spine coupled to the first support and the second support in a non-rotating manner relative to the first support and the second support, wherein the spine is transverse to the first support axis and the second support axis;
    a third support associated with the spine, such that the third support is spaced from and on a side of the second support opposite the first support; and a motor coupled to at least one of the first support or the second support, and configured to supply torque to rotate the rotating body.

16. The support assembly of claim 15, wherein the rotating body is disposed between the first support and the second support, and wherein an interface configured to transfer at least one of power signals or data signals to the rotating body is disposed between the second support and the third support.

17. The support assembly of claim 15, wherein the first support, the second support, and the third support are substantially parallel.

18. The support assembly of claim 15, wherein the spine defines a recess configured to receive at least one of an electrical conductor or a data signals link associated with the motor.

19. The support assembly of claim 15, wherein the third support defines a recess configured to receive at least one of an electrical conductor or a data signals link associated with the motor.

20. The support assembly of claim 15, further comprising:
a first bearing, disposed on the first support, configured to facilitate rotation of the rotating body; and
a second bearing, disposed the second support, configured to facilitate rotation of the rotating body.

* * * * *